United States Patent Office.

IVAN LEVINSTEIN AND HERMANN PFEIFFER, OF MANCHESTER, ENGLAND, ASSIGNORS TO THE LEVINSTEIN, LIMITED, OF SAME PLACE.

SUBSTANTIVE RED TETRAZO DYE AND PROCESS OF MAKING SAME.

SPECIFICATION forming part of Letters Patent No. 625,174, dated May 16, 1899.

Application filed June 14, 1897. Serial No. 640,743. (Specimens.)

*To all whom it may concern:*

Be it known that we, IVAN LEVINSTEIN, a subject of the Queen of Great Britain and Ireland, and HERMANN PFEIFFER, a subject of the German Emperor, both residing at Manchester, in the county of Lancaster, England, have invented certain new and useful Improvements in the Production of a New Color Base and of Coloring-Matters Therefrom, of which the following is a specification.

This invention has been patented in Great Britain, dated November 16, 1896, No. 25,725; in India, dated December 19, 1896, No. 435; in Germany, dated March 19, 1897, No. 94,410; in France, dated March 19, 1897, No. 265,155, and in Austria, dated March 8, 1897, No. 47/3,892.

Hitherto chlorinated benzidin derivatives have been produced from metachlornitrobenzene and from parachlorazobenzene. Ewer and Pick produced coloring-matters from dichlorbenzidin which they obtained from metachlornitrobenzene; but these coloring-matters are not direct dyes. We have discovered new chlorinated benzidins the tetrazo compounds of which form, with amins or phenols or with their sulfonic or carboxylic acids, coloring-matters which die cotton fibers without a mordant.

In proceeding according to this invention for the production of the new chlorobenzidins the hereinafter-described process may be followed by way of example: Thus 26.8 kilos of diacetbenzidin are dissolved in about three times their weight of ordinary concentrated sulfuric acid of about specific gravity 1.83 at ordinary temperatures and the resulting solution is poured into ice-cold water. The mixture, being kept at a low temperature, has then gradually added to it, with constant stirring, a sufficiency of a solution of ten-per-cent. bleaching-powder (or of other suitable hypochlorite) to form a dichlorbenzidin. The reaction is completed when the original green color changes to a light yellow. The temperature is then raised to 40° centigrade, and after standing for about twelve hours the new chlordiacetbenzidin is obtained in the form of a yellowish precipitate, which is filtered off and saponified by known means— as, for example, by boiling it with from three to four times its quantity of twenty-per-cent. hydrochloric acid. On cooling the greater part of the chlorbenzidin hydrochlorid separates out and the new color base is obtained from it by precipitating the salt with alkalies, filtering, pressing, and drying.

Instead of chlorinating diacetbenzidins by means of hypochlorites in acid solution free chlorin may be allowed to act on the diacetbenzidin in the following manner: 26.8 kilos of diacetbenzidin are suspended in about two hundred liters of solution of common salt, a little iron wire is added as a carrier, and while the solution is cooled by external application in the known manner chlorin is passed into the mixture as long as it continues to be absorbed. Subsequent saponification is afterward effected, as hereinbefore described. We, however, prefer to employ the hypochlorites as the source of chlorin, as first herein set forth.

This new base possesses very valuable properties for the production of direct-dyeing coloring-matters or dyestuffs.

The chemical formula of the new base is:

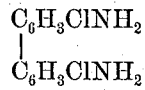

The tetrazo compound of the new chlorbenzidin forms, for example, with sodium naphthionate, red coloring-matters which are much bluer and faster to acids than the corresponding coloring-matters obtained from tetrazodiphenyl or tetrazoditolyl.

Example I. *For the production of a direct-dyeing bluish-red coloring-matter.*—Twenty-six kilos of the new base are dissolved in three hundred liters of water containing seventy kilos of hydrochloric acid 18° Baumé, the whole cooled with ice. To this there is slowly added while stirring an aqueous solution of fourteen kilos of sodium nitrite. The tetrazo compound thus obtained is run into an aqueous solution of fifty kilos of sodium naphthionate, (one hundred per cent.,) containing sufficient sodium acetate to neutralize all mineral acid. The coloring-matter thus formed separates out as a red precipitate. After twelve hours' stirring the mixture is made alkaline, heated to about 80° centigrade, salted out, filtered, pressed, and dried. The dried product forms a dark-red powder which dyes unmordanted cotton a bluish red distinguished by its comparative fastness to acid.

Example II. If instead of napthionic acid a corresponding quantity of the sodium salt of the beta-naphthylamin sulfonic acid (Brönner) is combined with the tetrazo body of our new dichlorbenzidin, a coloring-matter results which dyes unmordanted cotton a bright bluish red which is fast to organic acids.

Having now particularly described and ascertained the nature of our said invention and in what manner the same is to be performed, we declare that what we claim is—

1. The process for the production of substantive tetrazo coloring-matters which consists in chlorinating diacetbenzidin, saponifying the product, tetrazotizing the dichlorbenzidin thus formed, and combining the resulting tetrazodichlorbenzidin with a naphthylamin sulfonic acid, substantially as hereinbefore described.

2. The process for the production of a dyestuff component which consists in chlorinating diacetbenzidin melting at 317° centigrade and in saponifying the product, substantially as hereinbefore described.

3. In the manufacture of tetrazo coloring-matters, the process for the production of an intermediate product which consists in combining one molecule of tetrazodichlorbenzidin with one molecule of a naphthylamin sulfonic acid, substantially as hereinbefore described.

4. As a new article of manufacture, the substantive tetrazo coloring-matter produced by the action of tetrazodichlordiphenyl on a naphthylamin sulfonic acid, which is a red to dark-red powder easily soluble in water with a red to bluish-red color, is soluble with a blue color in concentrated sulfuric acid, and which dyes unmordanted cotton bright-red to bluish-red shades fast to organic acids, substantially as set forth.

IVAN LEVINSTEIN.
HERMANN PFEIFFER.

In presence of—
WILLIAM E. HEYS,
ARTHUR MILLWARD.